United States Patent [19]

Crounse

[11] Patent Number: 4,536,570
[45] Date of Patent: Aug. 20, 1985

[54] N-AMINOALKYLENESULFONAMIDO SUBSTITUTED DISAZO COLORANTS

[75] Inventor: Nathan N. Crounse, Myrtle Beach, S.C.

[73] Assignee: The Hilton-Davis Chemical Co., Cincinnati, Ohio

[21] Appl. No.: 436,509

[22] Filed: Oct. 25, 1982

Related U.S. Application Data

[62] Division of Ser. No. 195,118, Oct. 8, 1980, Pat. No. 4,379,089.

[51] Int. Cl.$^3$ ............ C09B 33/02; C09B 35/30; D06P 1/02; D21H 1/46
[52] U.S. Cl. ........................................ 534/819; 8/919; 8/641; 162/162; 534/728; 534/734; 534/759; 534/760; 534/797; 534/864; 534/878
[58] Field of Search ............... 260/174, 160, 178, 184, 260/187, 157; 8/639, 641; 534/819, 797, 728, 759, 760, 878, 864, 734

[56] References Cited

U.S. PATENT DOCUMENTS 1,904,820  4/1933  Brightman ...................... 260/178
2,863,875  12/1958 Bienert et al. .................. 260/178 X
3,096,322  7/1963  Straley et al. .................. 260/204
4,046,502  9/1977  Moser et al. ................... 260/157 X

FOREIGN PATENT DOCUMENTS 1253766  4/1960  France ............................ 260/187

Primary Examiner—Floyd D. Higel
Attorney, Agent, or Firm—Terrence E. Miesle; Paul E. Dupont; B. Woodrow Wyatt

[57] ABSTRACT

This invention relates to novel mixtures consisting essentially of benzanilide bridged disazo compounds which are randomly substituted with x (N-substituted sulfonamido) groups, to acid-addition salts of said disazo compounds, useful as direct dyes particularly in the dyeing of cellulose, and to methods of preparation of said mixtures of (N-substituted sulfonamido) substituted disazo compounds.

2 Claims, No Drawings

N-AMINOALKYLENESULFONAMIDO SUBSTITUTED DISAZO COLORANTS

CROSS REFERENCE TO RELATED APPLICATION

This application is a division of co-pending application Ser. No. 195,118, filed Oct. 8, 1980, and now U.S. Pat. No. 4,379,089.

BACKGROUND OF THE INVENTION (a) Field of the Invention

This invention relates to a group of compounds classified in the field of chemistry and more particularly to novel monoazo and disazo compounds useful as direct dyes, particularly in the dyeing of cellulose; to the acid-addition salts thereof; to processes for preparing said monoazo and disazo compounds and said acid-addition salts.

(b) Description of the Prior Art

A class of compounds known as direct dyes are known to be useful as dyeing agents for paper and fabrics. Among this group of direct dyes there are water-soluble azo and disazo dyestuffs and their acid-addition salts. However, heretofore known water-soluble azo and disazo dyestuffs and their acid-addition salts have suffered from a number of deficiencies when employed as dyes for coloring cellulose in the form of bleached pulp of the type used for the manufacture of household paper goods such as paper napkins, paper toweling, facial tissues and so forth. Thus, they have been found to bleed undesirably out of paper products colored with them when the article is brought into contact with common household solutions, for example, water, milk, soap solutions, detergent solutions, alcoholic beverages, vinegar, rubbing alcohol and so forth. They have also been found to have relatively poor substantivity to bleached pulp and suffer from a low rate and degree of exhaust from dyeing solutions containing them. They have also been found to have a relatively poor degree of color discharge when bleached with hypochlorite or "chlorine" bleach. There is thus a need for azo dyestuffs for coloring bleached pulp which have a high bleed resistance, good substantially, both a high rate and a high degree of exhaust from aqueous dyeing solutions in which they are utilized, and which have a high degree of color discharge when bleached with hypochlorite or "chlorine" bleach.

The following items to date appear to constitute the most relevant prior art with regard to the instant invention.

U.S. Pat. No. 2,863,875 (issued Dec. 9, 1958) discloses azo dyestuffs containing the radical [—SO$_2$N(R$_1$)(R$_2$NR$_3$R$_4$)]$_n$ wherein R$_1$ is hydrogen or a lower alkyl, R$_2$ is a lower alkylene, R$_3$ and R$_4$ are lower alkyl or hydroxy lower alkyl, and n is one to eight. The products are taught to be useful for dyeing cotton, wool, cellulose, polyamides, polyacrylics, paper and paper raw materials.

U.S. Pat. No. 3,096,322 (issued July 2, 1963) teaches monoazo dyestuffs and their precursor anilines and acetanilides bearing the radical —SO$_2$NHRN(R$_1$)$_2$ wherein R represents an alkylene radical having 2 or 3 carbon atoms and R$_1$ represents an alkyl radical having 1 to 4 carbon atoms or N(R$_1$)$_2$ collectively represents the heterocyclic piperidyl or morpholinyl radicals. The azo compounds are taught to be useful for dyeing acrylic fibers.

French Pat. No. 1,253,766 (issued Apr. 11, 1960) teaches a monoazo dyestuff bearing the radical

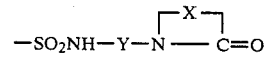

wherein Y is an alkylene and X is a 3 or 4 carbon alkylene. The azo compounds are taught to be useful when complexed with cobalt or chromium for dyeing wool, silk and polyamides.

SUMMARY OF THE INVENTION

In its composition of matter aspect, the invention relates to novel mixtures of (N-substituted sulfonamido) monoazo and disazo compounds useful for coloring natural fibers, synthetic fiber-forming material and cellulosic materials as well as in the manufacture of paper, varnishes, inks, coatings and plastics and to the acid-addition salt forms of the mixtures of N-(substituted sulfonamido) monoazo and disazo compounds.

In its process aspects, the invention relates to a process for preparing novel mixtures of (N-substituted sulfonamido) monoazo and disazo compounds which comprises in a first step chlorosulfonating a monoazo or a disazo compound and in a second step interacting the chlorosulfonated monoazo or disazo compound with the appropriate alkylene diamine or (2-aminoethyl)-2-imidazolidinone.

DETAILED DESCRIPTION INCLUSIVE OF THE PREFERRED EMBODIMENTS

More specifically, this invention in the first of its composition of matter aspects relates to novel mixtures consisting essentially of a disazo compound which is substituted with an average of x (N-substituted sulfonamido) groups per molecule wherein said disazo compound is selected from the group consisting of

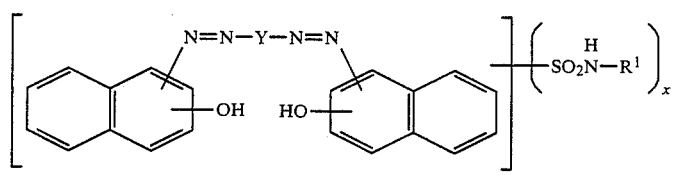

Formula I

-continued

Formula II

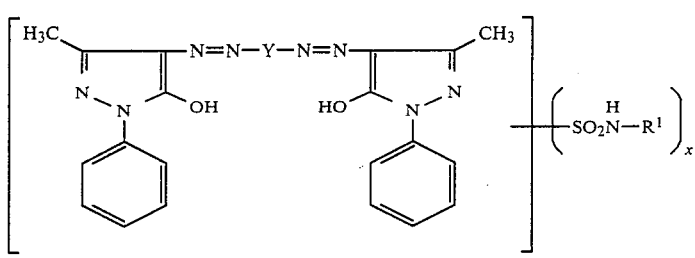

in which
x represents a number from 1 to 4,

Y represents a moiety selected from the class having the formulas

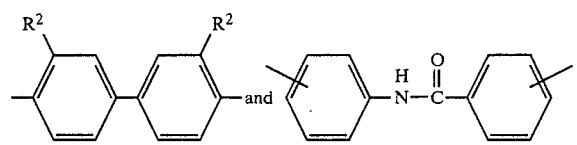

$R^1$ represents a moiety selected from the group consisting of alkylene-NH-alkylene-$NH_2$, alkylene-N-(non-tertiary $C_1$ to $C_4$ alkyl)$_2$,

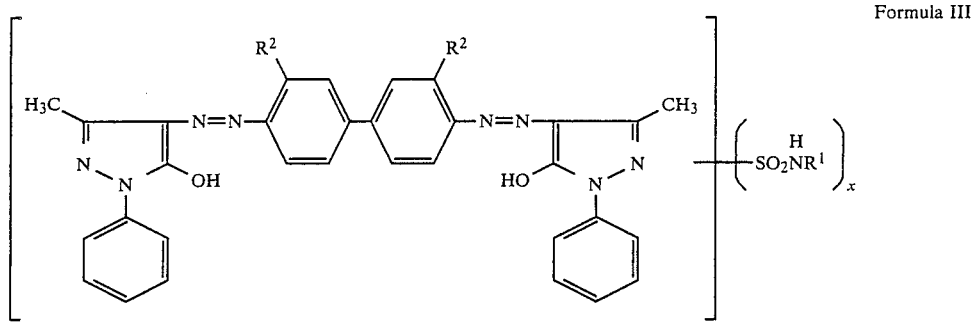

in which alkylene represents —$CH_2CH_2$— and —$CH_2CH_2CH_2$—;
$R^2$ represents hydrogen, $C_1$ to $C_3$ alkyl or $C_1$ to $C_3$ alkoxy; or
the acid-addition salt forms of said disazo compounds.

In the first particular embodiment in accordance with the first of its composition of matter aspects, the invention sought to be patented resides in the novel mixtures of (N-substituted sulfonamido) disazo compounds having the formula Formula III in which $R^1$, $R^2$ and x each have the same respective meanings given in Formula II.

In a second particular embodiment in accordance with the first of its composition of matter aspects, the invention sought to be patented resides in the novel mixtures of (N-substituted sulfonamido) disazo compounds having the formula Formula IV

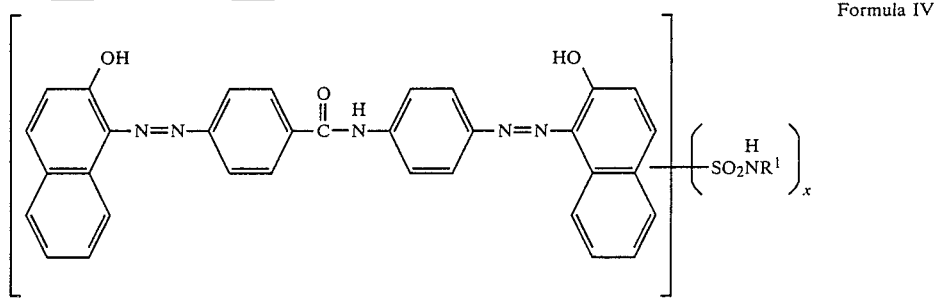

in which $R^1$ and x each have the same respective meanings given in Formula I.

In the second of its composition of matter aspects, the invention sought to be patented resides in novel mixtures consisting essentially of a monoazo compound which is substituted with an average of x (N-substituted sulfonamido) groups per molecule wherein said monoazo compounds are of the formula

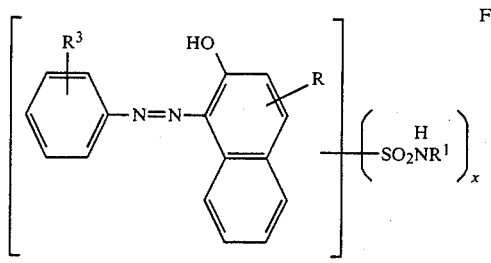

Formula V

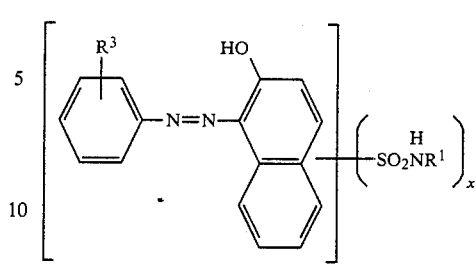

Formula VII in which
x represents a number from 1 to 4,
R represents hydrogen or the moiety

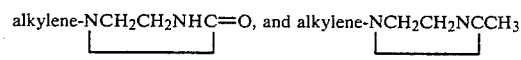

alkylene-NCH$_2$CH$_2$NHC=O, and alkylene-NCH$_2$CH$_2$NCCH$_3$ in which R$^4$ is hydrogen, C$_1$ to C$_3$ alkoxy or C$_1$ to C$_3$ alkyl,
R$^1$ represents a moiety selected from the group consisting of alkylene-NH-alkylene-NH$_2$, alkylene-N-(nontertiary C$_1$ to C$_4$ alkyl)$_2$,

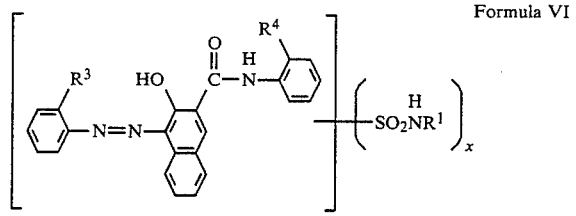

Formula VI in which alkylene represents —CH$_2$CH$_2$— and —CH$_2$CH$_2$CH$_2$—,
R$^3$ represents hydrogen, C$_1$ to C$_3$ alkyl or C$_1$ to C$_3$ alkoxy; or
the acid-addition salt forms of said monoazo compounds.

In a first particular embodiment in accordance with the second of its composition of matter aspects, the invention sought to be patented resides in the novel mixtures of (N-substituted sulfonamido) monoazo compounds having the formula

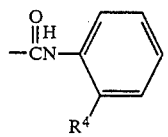

in which R$^1$, R$^3$, R$^4$ and x each have the same respective meanings given in Formula V.

In a second particular embodiment in accordance with the second of its composition of matter aspects, the invention sought to be patented resides in the novel mixtures of (N-substituted sulfonamido) monoazo compounds having the formula in which R$^1$, R$^3$ and x each have the same respective meanings given in Formula V.

In one of its process aspects, the invention sought to be patented resides in the process for preparing mixtures of (N-substituted sulfonamido) disazo compounds according to Formulas I and II which comprises in a first step interacting an appropriate disazo compound selected from the group having the formulas

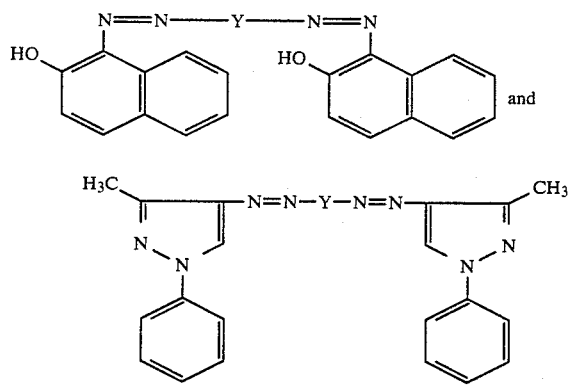

with chlorosulfonic acid and thionyl chloride to incorporate x molecular equivalents of the chlorosulfonyl group per molecule of disazo compound obtaining a mixture of (chlorosulfonyl) disazo compounds, in a second step, interacting said mixture of (chlorosulfonyl) disazo compounds with an excess of an amine of the formula H$_2$NR$^1$ to obtain the mixtures of (N-substituted sulfonamido) disazo compounds of Formulas I and III and in the instance where R$^1$ in N-[2-(2-oxo-imidazolidin-1-yl)ethyl], in a third step, the resulting mixture of [N-2-(2-oxo-imidazolidin-1-yl)ethyl]sulfonamido disazo compounds is hydrolyzed in an acid medium and, in a fourth step, the resulting mixture is rendered alkaline to obtain a mixture of N-[N'-(2-aminoethyl)-2-aminoethyl]sulfonamido disazo compounds wherein R$^1$, Y and x each have the same respective meanings given in Formulas I and II.

In a second of its process aspects, the invention sought to be patented resides in the process for preparing a mixture of (N-substituted sulfonamido) monoazo compounds according to Formula V which comprises in a first step interacting the appropriate monoazo compound of the formula

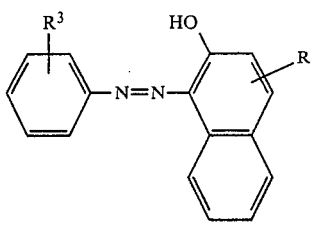

with chlorosulfonic acid and thionyl chloride to obtain a mixture of (chlorosulfonyl substituted) monoazo compounds, in a second step, interacting the resulting mixture of (chlorosulfonyl substituted) monoazo compounds with an excess of an amine of the formula $H_2NR^1$ to produce a mixture of ($R^1NHSO_2$-substituted) monoazo compound and in the instance where $R^1$ represents N-[2-(2-oxo-imidazolidin-1-yl)ethyl], in a third step, hydrolyzing the mixture of {N-[2-(2-oxo-imidazolidin-1-yl)ethyl]sulfonamido} monoazo compounds in a strong acidic medium and, in a fourth step, rendering the resulting mixture from the third step alkaline to obtain the mixture of {N-[N'-(2-aminoethyl)-2-aminoethyl]sulfonamido} monoazo compounds wherein R, $R^1$, $R^3$ and x each have the same respective meanings given in Formula V.

As used herein the term "$C_1$ to $C_3$ alkyl" and "$C_1$ to $C_4$ non-tertiary alkyl" denotes saturated monovalent straight and branched aliphatic hydrocarbon radicals including methyl, ethyl, propyl, isopropyl, butyl, secondary butyl and isobutyl.

The term "$C_1$ to $C_3$ alkoxy" includes saturated, acyclic, straight or branch-chained groups such as methoxy, ethoxy, propoxy and isopropoxy.

The term "acid-addition salt" is used herein to mean that the respective acid molecules are present in the dyestuff molecule in the form of acid-addition adducts. It will, of course, be understood that the precise type of bonding will depend on the condition in which the dyestuff molecule exists, that is, as a discrete solid or dissolved in solution. Thus, in the former, it would be expected that the acidic materials would be bound by quaternization of primary, secondary and tertiary amino substitutents of the aminoalkylenesulfonamido tail chains while in the latter, it would be expected although the aminoalkylenesulfonamido substitutents would also be predominantly in the quaternized form, some dissociation is possible in such an "acid-base" system.

It is well known by those skilled in the art of dyestuff chemistry that synthetic processes for the chlorosulfonation of dyestuff molecules almost invariably produce mixtures of substituted products rather than a single product having a specific number of substitutents. This is, of course, the case with the instant compounds. The methods of chlorosulfonation of the monoazo and disazo dyestuffs are known and usually give mixture of chlorosulfonated products commprising, for example, bis-, tris- and tetrachlorosulfonates. The fact that mixtures are obtained and not a single compound is not in any way deleterius to the use of the product as dyestuffs. The procedures taught in U.S. Pat. No. 2,863,875 which have been followed to produce the requisite azo sulfonic acid chloride dyestuff intermediates herein, as would be expected have been found to produce mixtures of substituted azo dyestuff molecules. Accordingly, the terms like zero to one, one to three, one to five, and the like adopted in the claims and in the disclosure to describe the number of N-substituted sulfonamido and sulfonic acid substituents on the subject azo dyestuffs as well as the number of complexed acid molecules means the average number of said substituents per molecule of azo dyestuff. The meaning of these terms may be illustrated with reference to the amount or number of sulfonic acid substituents which are introduced into the azo compounds as a result of hydrolysis of the sulfonic acid chloride portion of the molecule both during isolation from its reaction mass and during the interaction of the sulfonic acid chloride with an appropriate amine in an aqueous medium to obtain the desired azo sulfonamido derivative. It is obvious that there cannot be 0.5 of a sulfonic acid substituent on the azo dyestuff molecule. This figure is, of course, an average value which results from the presence in the mixture of azo dyestuff molecules having either zero or one sulfonic acid substituent.

The instant novel acid-addition salt forms of the (N-substituted sulfonamido) azo dyestuffs provide shades of yellow to blue-red. They have valuable properties as water-soluble direct dyes useful in the dyeing art for coloring materials such as threads, sheets, filaments, textile fabrics and the like as well as in the manufacture of paper, varnishes, inks, coatings and plastics. Further, the free base forms of the (N-substituted sulfonamido) azo dyestuffs including the N-[2-(2-oxo-imidazolidin-1-yl)ethyl] sulfonamido derivatives are useful as pigments and as pigment additives.

The mixtures of (N-substituted sulfonamido) azo dyestuffs and the water-soluble acid-addition salts thereof of this invention are characterized by good lightfastness. The mixtures of the azo dyestuffs in the form of their water-soluble acid-addition salts are useful as dyes for dyeing operations, and in the water-insoluble free base forms as well as their acid-addition salt forms as pigments for printing operations on woven and non-woven substrates made from natural fibers, such as wool, cellulose or linen, those made from semi-synthetic fibers, such as regenerated cellulose as represented by rayon or viscose, or those made from synthetic fibers, such as polyaddition, polycondensation or polymerization compounds. Such dyeings or printings can be carried out in accordance with the usual dyeing and printing processes.

The mixtures of the (N-substituted sulfonamido) azo dyestuffs and their acid-addition salt forms of this invention are also suitable for surface coloring or printing paper products and cardboard as well as for coloring paper pulps. Moreover, they are useful for incorporation into lacquers and films of various constitutions, for example, those made from cellulose acetate, cellulose propionate, polyvinyl chloride, polyethylene, polypropylene, polyamides, polyesters of alkyd resins. In addition, the subject compounds are suitable for coloring natural or synthetic resins, for example, acrylic resins, epoxy resins, polyester resins, vinyl resins, polystyrene resins, or alkyd resins.

The mixtures of (N-substituted sulfonamido) azo dyestuffs are readily converted to the corresponding water-soluble dyes by treatment in an aqueous solution containing from 0.5 to 10 equivalents of one or more of an inorganic acid, aliphatic or hydroxyaliphatic carboxylic acid and alkanesulfonic acid selected from the group consisting of hydrochloric, hydrobromic, acetic, propionic, glycolic, 3-hydroxypropionic, lactic, methanesulfonic and ethanesulfonic acids.

The mixtures of the acid-addition salt forms can be isolated from the aqueous solution in which they are formed by techniques well known in the art, for example, by salting out, precipitation or concentration by evaporation. However, the mixtures of water-soluble dyes thus formed are readily utilized in the form of aqueous solutions for many of their applications, especially for dyeing cellulose. Accordingly, it is particularly preferred to retain the mixtures of dyes in a concentrated aqueous solution of the type regularly employed in the paper industry for dyeing paper products.

The acid-addition salt forms are especially valuable dyes for imparting stable yellow to blue-red shades to paper both sized and unsized. For use in the paper trade, the mixtures of the acid-addition salt forms of this invention have several outstanding advantages. Their high degree of water-solubility makes them particularly suitable for the preparation of liquid dye concentrates which are preferred in the paper industry. The use of concentrated aqueous solutions is particularly advantageous in view of the increasing trend toward automation, since these solutions are conveniently handled and added to the pulp slurry in accurately measured amounts by means of pulp and meters. The subject aqueous dye concentrates are particularly suited to metered dyeing operations because they have low viscosity which remains essentially unchanged over long periods under ordinary storage conditions. Their low viscosity provides another advantage in that they dissolve readily in the pulp slurry and prevent specking or blotching seen when more viscous dye concentrates are used. A further advantage of the concentrated aqueous solution is that of convenience in shipping and handling. In shipping and its use, the high degree of solubility of the acid-addition salt forms permit handling of solutions containing a higher dye content and results in a desirable decrease in the weight and volume of solution per amount of dye. Furthermore, the concentrated aqueous dye solutions are more convenient for the paper mills in that the handling of dry dye, with the concomitant dusting and caking problems associated with dissolving the dye prior to its addition to the pulp slurry are eliminated.

The subject dyes constituting the mixtures of my invention are also generally less prone to "bleed" than dyestuffs heretofore known when paper impregnated therewith is wet and placed in contact with moist white paper. This is a particularly desirable property for dyes designed for coloring absorbent grade paper to be used in facial tissues, napkins, paper towels and the like wherein it can be foreseen that the colored paper, wetted with common household liquids such as water, soap and detergent solutions, milk, carbonated and alcoholic beverages, vinegar, rubbing alcohol, and so forth, may come in contact with other surfaces such as textiles, paper and the like which should be protected from stain. Another advantageous property of these new mixtures of water-soluble dyes for use in the paper trade is found in their high degree of color discharge when bleached with hypochlorite or "chlorine" bleach. This property of the mixtures of the acid-addition salt forms is particularly desired by papermakers in order that dyed paper may be completely bleached prior to reprocessing. Still another advantageous property of the mixtures of water-soluble dyestuffs of this invention is found in their high resistance to a change of shade when used in color cellulosic materials, which have either previously been treated with or are treated subsequent to dyeing, with wet-strength resin.

I have also found that the dyes of this invention have a high degree of substantivity for bleached fiber such as is used in most colored disposable paper products. Moreover, they are absorbed by cellulosic fibers from aqueous solution at a very rapid rate. These properties are advantageous to the paper industry, because it allows the dye to be added to the pulp just prior to formation of the sheet.

The best mode contemplated by the inventor of carrying out this invention will now be described as to enable any person skilled in the art to which it pertains to make and use the same.

The mixtures of disazo compounds of Formulas I and II and the mixtures of monoazo compounds of Formula V can be obtained by interacting the appropriate disazo or monoazo compound with chlorosulfonic acid and thionyl chloride to obtain the corresponding mixtures of chlorosulfonated disazo or monoazo compound which after isolation is further reacted with an excess of amine of the formula $H_2HR^1$ to obtain the desired mixtures of (N-substituted sulfonamido) disazo or monoazo compounds. As an illustration, the monoazo compound (4-methoxyaniline→2-hydroxynaphthalene) was interacted with chlorosulfonic acid and thionyl chloride. The reaction is conveniently carried out in excess chlorosulfonic acid at a temperature in the range of 10° to 35° C. The reaction mixture is poured onto ice and the corresponding mixture of (chlorosulfonated) monoazo compounds are isolated by filtration. The mixture of (chlorosulfonated) monoazo compounds are interacted with an excess of 1-(2-aminoethyl)-2-imidazolidnone. The reaction is conveniently carried out in water in the presence of an alkaline carbonate, for example, potassium carbonate and an organic base, for example, pyridine at a temperature in the range of 45° to 85° C. After isolation, the resulting mixture of {N-[2-(2-oxo-imidazolidin-1-yl)ethyl]sulfonamido} monoazo compounds are hydrolyzed in a dilute aqueous acid. The hydrolysis solution is made slightly alkaline by the addition of an aqueous alkali and the mixture of {N-[N'-(2-aminoethyl)-2-aminoethyl]sulfonamido} monoazo compounds of Formula V or more specifically of Formula VII are isolated.

The generally known monoazo and disazo compound starting materials are identified herein by the well known nomenclature shorthand, amine→coupling agent, for example, aniline→β-naphthol, which signifies the diazotized amine is coupled to the coupling agent.

The requisite monoazo and disazo compounds useful as starting materials are known as a class in the art and are commercially available or can be readily obtained by procedures well known in the prior art.

The requisite 1-(2-aminoethyl)imidazolidinone intermediate is a known compound readily obtained by procedures taught in U.S. Pat. Nos. 2,613,212 and 2,868,727. Thus, one molecular equivalent of urea is interacted with one molecular equivalent of diethylene triamine liberating ammonia. The reaction can be carried out neat or in the presence of water which is distilled off during the course of the reaction. The reaction is conveniently carried out at a temperature in the range of 100° to 250° C. The 1-(2-aminoethyl)imidazolidinone can be used directly from the reaction or it can be distilled at reduced pressure before using.

The reaction amine intermediates required for interaction with mixtures of (chlorosulfonyl) disazo and monoazo compounds to obtain the compounds of Formulas I, II and V wherein $R^1$ is alkylene-N-non-tertiary-$(C_1$ to $C_4$ alkyl$)_2$ are known compounds whose preparation is well known in the prior art. The following compounds are exemplary of these reactive amine compounds useful in the practice of this invention.

3-Dimethylaminopropylamine
3-Diethylaminopropylamine
3-Dibutylaminopropylamine
2-Dimethylaminoethylamine
2-Diethylaminoethylamine
2-Diisopropylaminoethylamine
4-Diethylaminobutylamine The following examples set forth the methods of preparation of the mixtures of (N-substituted sulfonamido) disazo and monoazo compounds; and acid-addition salts thereof. Included in the following examples are the results of the "bleed" tests as described in Example 1 of samples of paper prepared from pulp dyed with the products of the following examples. In these "bleed" tests the dyed sample of paper is wetted with the appropriate household liquid and placed as a filler below clean, dry, white filter paper. After a period of time the so-called "sandwich" is disassembled and the component piece mounted and dried. The filter papers are then examined under daylight and evaluated with respect to the amount of dye which bled from the dyed paper sample to the filter paper.

EXAMPLE 1

A. With stirring, 28.8 g of the red pigment (2-methoxyaniline→3-hydroxy-2-naphth-o-anisidide) was added slowly to 116.0 ml of chlorosulfonic acid while maintaining 20° to 25° C. by means of an external ice-water bath. After the resulting mixture was stirred overnight at ambient temperature, 17.7 ml of thionyl chloride was added slowly and the reaction mixture was stirred an additional seven hours at ambient temperature. The resulting solution was added slowly to a mixture of 1200.0 g of ice and 400.0 ml of water with stirring. The separated solid was collected by filtration and washed with cold water.

B. The water wet filter cake was suspended in 150.0 ml of cold water and 50.0 g of dimethylpropylamine and 2.0 ml of pyridine were added. The resulting slurry, pH 9.6, was stirred overnight at ambient temperature, and an additional hour at 60° to 65° C. and during this hour the pH dropped to 9.2. The slurry was cooled to room temperature, flooded to twice its original volume with water and the solid collected by filtration. The filter cake was suspended in 800.0 ml of water and this slurry was stirred at 90° C. for approximately thirty minutes. After the slurry was cooled to ambient temperature, the solid was collected by filtration, washed with water and dried in vacuo at 550° C. to obtain 43.6 g of the mixture consisting essentially of the monoazo compounds with an average of two dimethylaminopropylsulfonamido moieties per molecule and having the formula

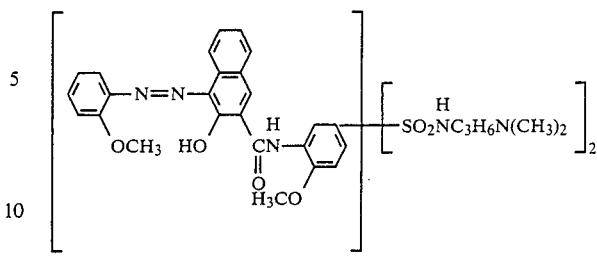

The visible absorption spectrum of an aqueous acetic acid solution of this dyestuff, containing 0.02 g of dye per liter of solution showed a maximum at 508 millimicrons, A=0.409.

Paper dyed with aqueous dilutions of this concentrate had a yellow-red shade and was found to be highly bleachable in the bleach test described hereinbelow. The dye was found to bleed only slightly from dyed paper in the water bleed test and moderately in the soap bleed test described hereinbelow.

DYEING PROCEDURE

A 0.1 percent stock dye solution was prepared by dissolving 1.0 g of the mixture of monoazo compounds from part B above and 5.0 ml of 10 percent aqueous acetic acid to a volume of one liter with distilled water. With stirring, 150.0 ml of the 0.1 percent dye solution was added to 100.0 g of an aqueous slurry containing approximately 3 grams of bleached kraft pulp (600 Canadian Standard Freeness). Agitation was continued for approximately fifteen minutes prior to dilution with water to a volume of four liters with agitation. The dyed pulp was then formed into an 8 by 8 inch square of paper by means of a filter-box. The paper sheet was pressed between two blotter and then dried at 180° F. for four minutes between two fresh blotters to yield a uniformly dyed red-orange paper sheet.

B. Sized Paper Grades:

With stirring 150.0 ml of the 0.1 percent stock dye solution was added to 100.0 g of an aqueous slurry containing 3 grams of bleached kraft pulp (600 Canadian Standard Freeness). After approximately three minutes of stirring, 5.0 g of a 1.5 percent water solution of papermaker's alum was added. Stirring was continued for approximately fifteen minutes before it was diluted to four liters with water and the pH adjusted to 5.0 with dilute sulfuric acid. The dyed fiber slurry was drawn into an 8 by 8 inch square of paper and dried as described in part A above.

TESTING PROCEDURES

The following test procedures were employed to determine the resistance of the dyestuffs to bleed in moist paper, to bleed from paper in the presence of soap or milk, and to bleaching with hypochlorite bleach.

Water Bleed Test

This procedure is a modification of the AATCC Standard Test Method 15-1962, "Colorfastness to Perspiration."

Test pieces consisting of four plies, each one inch square, are cut from the dyed paper to be tested. One or more dyed papers of known dye migration quality are included in the test series as standards.

The absorbent material consists of filter paper having a relatively smooth finish (Whatman #1, 4.25 cm. dia. equivalent). In addition, smooth, flat, glass or clear plastic plates of adequate stiffness, measuring two inches wide and three inches long, are required as separating plates. A 1000 gram weight serves as a dead weight loading.

Four filter paper absorbent pieces are used for each dyed paper test square, two for each side.

The migration test "sandwich" is constructed as follows. A separating plate is placed on a horizontal support and two pieces of the filter paper placed centrally on this plate with the smoother side up. The square dyed paper test pieces, held by tweezers, are immersed in tap water at room temperature for five seconds, drained for five seconds, and immediately centered on the filter paper. Immediately, two pieces of filter paper are centered on the test square and followed at once by another separating plate. This "sandwich" is pressed for a moment with the fingers, after which, without delay, two pieces of filter paper are positioned on the top separating plate as before to receive a second test square of wetted dyed paper. The above procedure is then repeated as rapidly as possible and without interruption, stacking one "sandwich" on the other, until all dyed paper test pieces have been put under test.

As soon as a stack is completed, a 1000 gram weight is centered on the top separating plate. The stack is allowed to stand at room temperature (75° F.) for fifteen minutes.

At the end of the migration period, the stack is disassembled, and each dyed paper test square and its filter paper asborbents clipped to a supporting card. A separate card is used for each test square. The dyed paper test squares and filter papers are air dried at room temperature for at least two hours (in the dark) before ranking. Relative degrees of dye migration, as compared to that from standard samples, are determined by visual ratings, in daylight, of the intensity of dye stain on the filter paper surfaces which had been in contact with the test square. The evaluations are graded on the basis of the following scale:

| Bleed Grade | Definition |
|---|---|
| none | no observable bleed |
| trace | first noticeable bleed |
| slight | approximately twice the trace amount of dye bleed |
| moderate | approximately four times the trace amount of dye bleed |
| appreciable | approximately eight times the trace amount of dye bleed |
| much | approximately sixteen times the trace amount of dye bleed |
| very much | approximately thirty-two times the trace amount of dye bleed |

Soap Bleed Test

This procedure utilizes the same method employed in the water bleed test described above, except that the dyed paper test squares are immersed in a 0.5 percent tap water solution of white soap flakes (a mixture of 80 percent sodium soap and 20 percent potassium soap produced from 70 percent tallow and 30 percent coconut oil glyceride blend; "Ivory" brand, Proctor & Gamble Co.) at 120° F., instead of water alone.

Milk Bleed Test

This procedure utilizes the same method employed in the water bleed test described above, except that the dyed paper squares are immersed in room temperature homogenized milk instead of water.

Bleach Test

This procedure compares the degree to which the color of dyed papers would be discharged in a waste paper recovery operation employing hydrochloric bleach.

A preliminary estimate of bleachability is obtained by placing a drop of hypochlorite bleach, containing 2.5 percent available chlorine; on the dyed paper and allowing it to dry at room temperature. From this test, both rate and degree of bleachability are estimated.

A more accurate test, approximating paper mill procedure, is performed by defibering three grams of dyed paper in 150.0 ml of distilled water using a kitchen blender. The defibered pulp slurry is placed in a jar and hypochlorite is added to the extent desired, usually 2.5 percent available chlorine based on the weight of the dry fiber. The slurry consisting of pulp and hypochlorite is adjusted to pH 9 with dilute sulfuric acid or dilute aqueous solution of sodium hydroxide and placed in a water bath to maintain the interval in the temperature range of 115° to 125° F. After the test is started, the jar is loosely capped. At five minute intervals, the cap is tightened and the jar inverted twice to circulate the liquor. The cap is loosened between inversions. After twenty minutes, the pH is checked, and if higher than 7.5, is adjusted thereto. The test is then continued for an additional twenty minutes (with five minutes between inversions). The terminal pH is generally found to be 6.0-6.5. An excess of sodium thiosulfate is added as an antichlor, mixed for five minutes and the slurry is diluted to a concentration of approximately 0.3 percent of fiber. Sheets are then prepared at pH 7 without a washing step. Finally, this sheet is pressed and dried in a paper dryer. Control dyeings at specific levels can than be made to accurately determine the loss of strength of color on bleaching.

EXAMPLE 2

A. Under a nitrogen atmosphere, 40.6 g of the red pigment (2-methoxyaniline→2-hydroxynaphthelene) was added slowly over 15-20 minutes to 400.0 g of chlorosulfonic acid maintaining 20° to 25° C. by means of an external cold water bath. The mixture was stirred for two hours at 20° to 31° C. After cooling to 20° C., 23.2 ml of thionyl chloride was added over ten minutes. The resulting mixture was stirred for approximately twenty-three hours and added slowly to a mixture of 500.0 g of ice, 500.0 g water and 50.0 g of sodium chloride maintaining a temperature of 0° to 10° C. by the gradual addition of approximately 750.0 g of ice. Following the addition of 50.0 ml of xylene, the mixture was stirred for approximately twenty minutes at 5° to 10° C., and the solid was collected by filtration and washed with one liter of 2 percent aqueous sodium chloride solution chilled to 5° to 10° C. to obtain 211.0 g of water wet pulp containing a mixture consisting essentially of the monoazo compounds chlorosulfonated with an average of two chlorosulfonyl moieties per molecule and having the formula

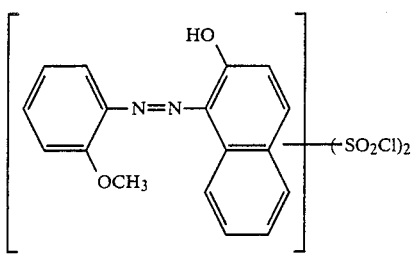

The nuclear magnetic resonance of the chlorosulfonic acid solution of the dyestuff before drowning was concordant with the above structure.

B. With stirring, 72.5 g of the water wet pulp from part A directly above was added slowly to a mixture of 70.0 ml of water and 30.6 g of dimethylaminopropylamine at 20° to 25° C. The mixture was stirred for approximately two and one half hours at 20° to 25° C. and then at 60° to 70° C. for approximately forty-five minutes. The pH of the mixture was adjusted to 8.5 using 3-N-hydrochloric acid and the separated solid was collected by filtration, washed with 900.0 ml of water and dried at 60° C. in vacuo to obtain 25.8 g of the mixture consisting essentially of the monoazo compounds with an average of two dimethylaminopropylsulfonamido moieties per molecule and having the formula

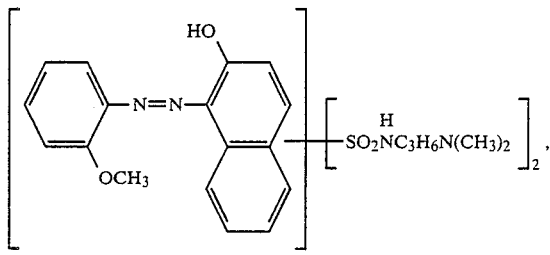

as a red-orange-colored solid which melted at 153° to 154° C.

The visible absorption spectrum of the dyestuff in a dilute acetic acid solution containing 0.0376 g of dyestuff per liter of solution had a maximum at 490 millimicrons, A = 1.328. The nuclear magnetic resonance spectrum was consistent with the assigned structure.

Paper dyed with aqueous acetic acid dilutions of this dyestuff had an orange-red shade and was found to be highly bleachable in the bleach test described above. The dye was found to bleed moderately in the water bleed test.

EXAMPLE 3

A. Proceeding in a manner similar to that described in Example 2, part A above, 40.6 g of the red pigment (4-methoxyaniline→2-hydroxynaphthalene) was interacted with 400.0 g of chlorosulfonic acid and 23.2 ml of thionyl chloride to obtain 297.0 g of water wet pulp containing the mixture consisting essentially of the monoazo compounds chlorosulfonated with an average of two chlorosulfonyl moieties per molecule and having the formula

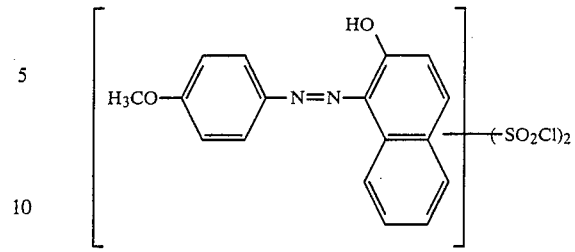

The nuclear magnetic resonance of the chlorosulfonated acid solution of the dyestuff isolation was consistent with the above structure.

B. In a manner similar to that described in Example 2, part B above, 101.5 g of pulp from part A directly above was interacted with 30.6 g of dimethylaminopropylamine to obtain 30.7 g of the mixture consisting essentially of the monoazo compounds with an average of two dimethylaminosulfonamido moieties per molecule and having the formula

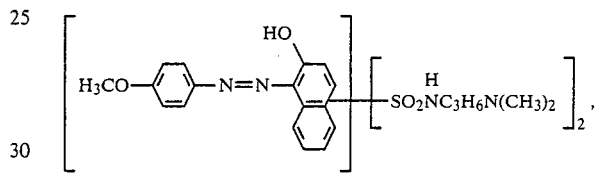

as a red-orange solid.

The visible absorption spectrum of the dyestuff in a dilute acetic acid solution containing 0.0376 g of dyestuff per liter of solution had a maximum at 414 millimicrons, A = 0.845. The nuclear magnetic resonance spectrum was consistent with the assigned structure.

Paper dyed with aqueous acetic acid dilutions of this dyestuff had a yellow-red shade and was found to be highly bleachable in the bleach test described above. The dye was found to bleed moderately in the water bleed test.

EXAMPLE 4

A. A mixture of 70.0 ml of water, 40.3 g of 80 percent 1-(2-aminoethyl)-2-imidazolidinone and 101.5 g of the mixture of disulfonylchloride monoazo dyestuffs from Example 3, part A above was stirred overnight at ambient temperature. After stirring one hour at approximately 60° C., the resulting solid was collected by filtration, washed with one liter of water to obtain the water wet filter cake containing a mixture consisting essentially of the monoazo compounds with an average of two N-[2-(2-oxo-imidazolidin-1-yl)ethyl]sulfonamido moieties per molecule and having the formula

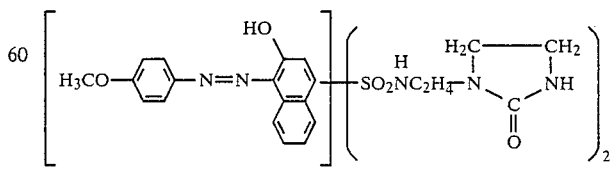

A 10.7 g sample of the filter cake was dried at 70° C. in vacuo to obtain 3.1 g of red solid which melted at 150° to 153° C.

B. To 106.0 ml of water, 96.3 g of the water wet filter cake from part A directly above was added with stirring and 51.0 ml of concentrated sulfuric acid was added slowly allowing the temperature to rise to approximately 80° C. The resulting solution was heated at reflux for approximately 20 hours, cooled to ambient temperature and set aside over the weekend. Slowly, the mixture was diluted with 200.0 ml of water, warmed to 40° C. and the pH adjusted to 8.0 with the addition of 90.0 ml of 50 percent aqueous sodium hydroxide. After stirring the slurry for two hours, the solid was collected by filtration, the filter cake washed with one liter of water and dried in a vacuum oven at 65° C. to obtain 17.6 g of the mixture consisting essentially of the monoazo compounds with an average of two aminoethylaminoethylsulfonamido moieties per molecule and having the formula

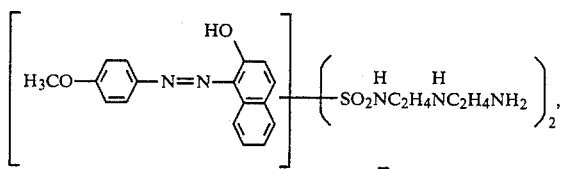

as a red-colored solid which melted at 266° to 267° C. with decomposition.

EXAMPLE 5

Proceeding in a manner similar to that described in Example 4, part A above, 40.3 g of the mixture of disulfonylchloride monoazo dyestuffs from Example 2, part A above, was interacted with 40.3 g of 80 percent 1-(2-aminoethyl)-2-imidazolidinone to obtain 94.4 g of water wet filter cake containing the mixture consisting essentially of the monoazo compounds with an average of two N-[2-(2-oxo-imidazolidin-1-yl)ethyl]-sulfonamido moieties per molecule and having the formula

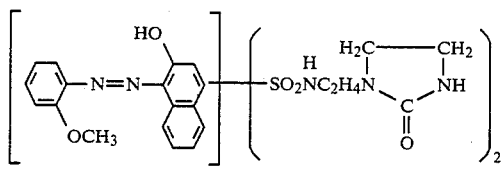

A 9.4 g sample of the water wet filter cake was dried in an air oven at 70° C. to obtain 2.5 g of solid dyestuff which melted at 163° to 166° C.

EXAMPLE 6

A. To 116.0 ml of chlorosulfonic acid, 41.5 g of Colour Index Pigment Red 41 (o-dianisidine→2 moles of 3-methyl-1-phenyl-5-pyrazolone) was added gradually. After stirring approximately two hours at ambient temperature, 26.3 ml of thionyl chloride was added over ninety minutes allowing the temperature to rise to 45° C. The reaction mixture was stirred four hours at a temperature between 45°–50° C. The mixture was allowed to cool to ambient temperature while standing overnight. Slowly, the reaction mixture was poured onto a mixture of 2000.0 g of ice and 400.0 ml of water keeping the temperature below 20° C. To the mixture, 30.0 ml of xylene was added and the resultant mixture was stirred two hours at a temperature below 20° C. The separated solid was collected by filtration and washed acid free to Congo Red test paper with cold water to obtain 186.5 g of water wet filter cake containing a mixture consisting essentially of the disazo compounds chlorosulfonated with an average of 2.8 chlorosulfonyl moieties per molecule and having the formula

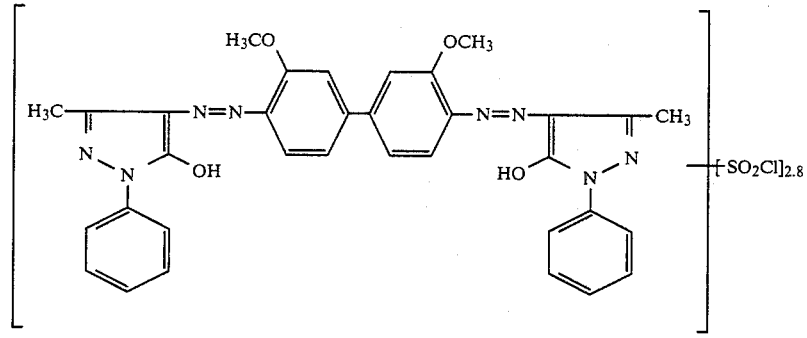

B. To a mixture of 27.5 g of 3-dimethylaminopropylamine and 200.0 ml of water chilled to 15° C., 93.2 g of the water wet filter cake from part A above was added slowly while maintaining a temperature between 15° to 20° C. The resulting slurry was stirred overnight at ambient temperature and then heated to 60° C. and stirred approximately one hour. The solid was collected by filtration, washed with water until the filtrate tested neutral to Brilliant Yellow test paper and dried in vacuo to obtain 34.4 g of a mixture consisting essentially of the disazo compounds with an average of 2.8 dimethylaminopropylsulfonamido moieties per molecule and having the formula

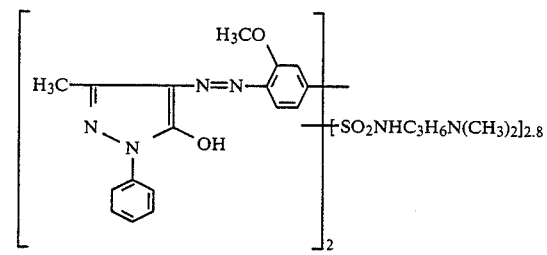

The visible absorption spectrum of an aqueous acetic acid solution of this dyestuff, containing 0.02 g of dye per liter of solution showed a maximum at 438 millimicrons, A=0.866.

Paper dyed with a dilute acetic acid solution of this dyestuff had a bright yellow-orange shade and was found to be highly bleachable in the bleach test described hereinabove. The dye was found to bleed only slightly from paper in the water bleed test described hereinabove.

EXAMPLE 7

With stirring, 53.7 g of the red dyestuff (4,4'-diaminobenzanilide→2 moles of β-naphthol) was added slowly to 200.0 ml of chlorosulfonic acid while maintaining a temperature between 20°-25° C. The resulting slurry was stirred overnight at ambient temperature and slowly 23.9 g of thionyl chloride was added. After stirring twenty-four hours at ambient temperature, the resultant reaction mixture was added slowly to a mixture of 1200.0 g of ice and 600.0 ml of water keeping the temperature below 20° C. The solid was collected by filtration and washed three times, each with 350.0 ml of one percent aqueous sodium chloride solution to obtain a water wet filter cake. The water wet filter cake was added to a mixture of 300.0 ml of cold water, 41.5 g of sodium carbonate, 51.0 g of dimethylaminopropylamine, and 2.0 ml of pyridine while maintaining a temperature below 25° C. by the gradual addition of ice. The resulting slurry was allowed to stir overnight at ambient temperature and then stirred at a temperature between 50° to 55° C. for approximately one hour. The solid was collected by filtration, washed with one liter of one percent aqueous sodium chloride solution and dried in vacuo to obtain 80.5 g of a mixture consisting essentially of the disazo compounds with an average of two dimethylaminopropylsulfonamido moieties per molecule and having the formula

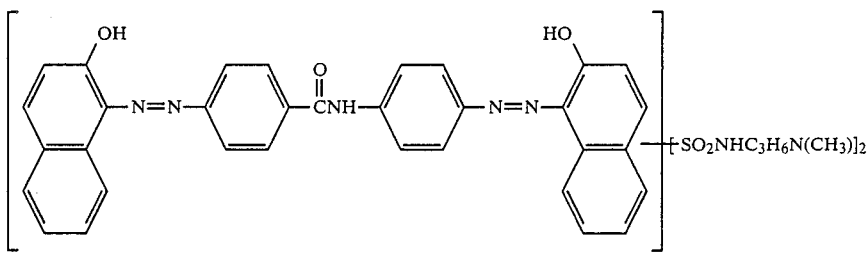

The visible absorption spectrum of an aqueous acetic acid solution of this dyestuff, containing 0.02 g of dye per liter of solution showed a maximum at 489 millimicrons, A=0.875.

Paper dyed with a dilute acetic acid solution of this dyestuff had a yellow-red shade and was found to be highly bleachable in the bleach test described hereinabove. The dye was found to bleed only slightly from paper in the water bleed test described hereinabove.

What is claimed is:

1. A mixture consisting essentially of a disazo compound which is substituted with an average of x (N-substituted sulfonamido) groups per molecule wherein said disazo compound is of the formula

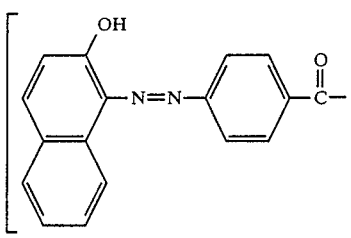

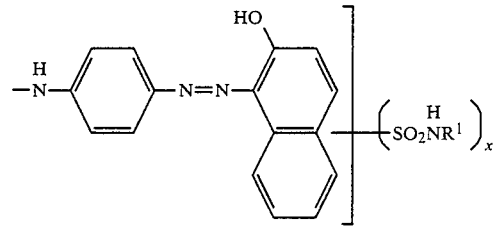

in which
x represents a number from 1 to 4, and
$R^1$ represents a moiety selected from the group consisting of alkylene-NH-alkylene-NH$_2$, alkylene-N-(non-tertiary C$_1$ to C$_4$ alkyl)$_2$,

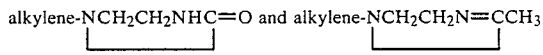

in which alkylene represents —CH$_2$CH$_2$— and —CH$_2$CH$_2$CH$_2$—; or
the acid-addition salt forms of said disazo compounds.

2. The mixture according to claim 1, where, in the disazo compound $R^1$ is —(CH$_2$)$_3$N(CH$_3$)$_2$.

* * * * *

UNITED STATES PATENT AND TRADEMARK OFFICE
CERTIFICATE OF CORRECTION

PATENT NO. : 4,536,570
DATED : August 20, 1985
INVENTOR(S) : Nathan N. Crounse

It is certified that error appears in the above-identified patent and that said Letters Patent is hereby corrected as shown below:

Column 1, line 44, "substantially" should read --substantivity--.

Column 5, lines 19-20, 30-38 and 54-59, the formulas at lines 19-20 should be inserted at line 28; the formula (VI) at lines 30-38 should be inserted at lines 54-59; and the formula at lines 54-59 should be inserted at lines 19-20.

Column 10, line 33, "imidazolidnone" should read --imidazolidinone--.

Signed and Sealed this

Twelfth Day of November 1985

[SEAL]

Attest:

DONALD J. QUIGG

Attesting Officer

Commissioner of Patents and Trademarks